US008431643B2

(12) United States Patent
Rodriguez et al.

(10) Patent No.: US 8,431,643 B2
(45) Date of Patent: Apr. 30, 2013

(54) POLYOLEFIN ADHESIVE COMPOSITIONS AND METHOD OF MAKING THEREOF

(75) Inventors: George Rodriguez, Houston, TX (US); Fran A. Shipley, Crosby, TX (US); Peijun Jiang, League City, TX (US); Charles L. Sims, Hemet, CA (US); Kenneth Lewtas, Wantage (GB)

(73) Assignee: ExxonMobil Chemical Patents Inc., Houston, TX (US)

( * ) Notice: Subject to any disclaimer, the term of this patent is extended or adjusted under 35 U.S.C. 154(b) by 218 days.

(21) Appl. No.: 12/761,531

(22) Filed: Apr. 16, 2010

(65) Prior Publication Data
US 2010/0305259 A1 Dec. 2, 2010

Related U.S. Application Data

(60) Provisional application No. 61/182,339, filed on May 29, 2009.

(51) Int. Cl.
*D21H 19/18* (2006.01)

(52) U.S. Cl.
USPC ............ 524/477; 524/489; 524/491; 524/583

(58) Field of Classification Search .................. 524/477, 524/489, 491, 583
See application file for complete search history.

(56) References Cited

U.S. PATENT DOCUMENTS

| | | | |
|---|---|---|---|
| 4,345,349 A | 8/1982 | Flanagan | |
| 4,540,753 A | 9/1985 | Cozewith et al. | |
| 4,960,295 A * | 10/1990 | Bodouroglou | 281/15.1 |
| 5,001,205 A | 3/1991 | Hoel | |
| 5,026,756 A | 6/1991 | Arendt | |
| 5,066,741 A | 11/1991 | Campbell, Jr. | |
| 5,153,157 A | 10/1992 | Hlatky et al. | |
| 5,198,401 A | 3/1993 | Turner et al. | |
| 5,206,197 A | 4/1993 | Campbell, Jr. | |
| 5,241,025 A | 8/1993 | Hlatky et al. | |
| 5,384,299 A | 1/1995 | Turner et al. | |
| 5,502,124 A | 3/1996 | Crowther et al. | |
| 5,530,054 A | 6/1996 | Tse et al. | |
| 5,548,014 A | 8/1996 | Tse et al. | |
| 5,942,459 A | 8/1999 | Sugano et al. | |
| 6,034,159 A * | 3/2000 | Malcolm | 524/293 |
| 6,117,962 A | 9/2000 | Weng et al. | |
| 6,235,818 B1 | 5/2001 | Morizono et al. | |
| 6,399,722 B1 | 6/2002 | Szul et al. | |
| 6,747,114 B2 | 6/2004 | Karandinos et al. | |
| 6,887,941 B2 | 5/2005 | Zhou | |
| 6,906,160 B2 | 6/2005 | Stevens et al. | |
| 6,927,256 B2 | 8/2005 | Stevens et al. | |
| 6,943,215 B2 | 9/2005 | Stevens et al. | |
| 7,060,754 B2 | 6/2006 | Stevens et al. | |
| RE39,307 E | 9/2006 | Zhou | |
| 7,109,269 B2 | 9/2006 | Stevens et al. | |
| 7,199,203 B2 | 4/2007 | Stevens et al. | |
| 7,210,339 B2 * | 5/2007 | Lewtas et al. | 73/105 |
| 7,220,801 B2 | 5/2007 | Dunaway | |
| 7,223,822 B2 | 5/2007 | Abhari et al. | |
| 7,238,759 B2 | 7/2007 | Stevens et al. | |
| 7,241,493 B2 | 7/2007 | Zhou | |
| 7,250,470 B2 | 7/2007 | Stevens et al. | |
| 7,294,681 B2 | 11/2007 | Jiang et al. | |
| 7,319,077 B2 | 1/2008 | Mehta et al. | |
| 7,344,775 B2 | 3/2008 | Stevens et al. | |
| 7,396,782 B2 | 7/2008 | Blenke et al. | |
| 7,476,710 B2 | 1/2009 | Mehta et al. | |
| 7,488,777 B2 | 2/2009 | Inoue | |
| 7,524,910 B2 | 4/2009 | Jiang et al. | |
| 7,541,402 B2 | 6/2009 | Abhari et al. | |
| 7,550,528 B2 | 6/2009 | Abhari et al. | |
| 7,700,707 B2 | 4/2010 | Abhari et al. | |
| 7,750,078 B2 | 7/2010 | Curry | |
| 2002/0193474 A1 * | 12/2002 | Daily et al. | 524/487 |
| 2004/0045666 A1 * | 3/2004 | Gong et al. | 156/334 |
| 2004/0127614 A1 * | 7/2004 | Jiang et al. | 524/270 |
| 2004/0138392 A1 | 7/2004 | Jiang et al. | |
| 2004/0220320 A1 | 11/2004 | Abhari et al. | |
| 2004/0220336 A1 | 11/2004 | Abhari et al. | |
| 2004/0249046 A1 | 12/2004 | Abhari et al. | |
| 2007/0021566 A1 * | 1/2007 | Tse et al. | 525/240 |
| 2008/0081868 A1 * | 4/2008 | Jiang et al. | 524/487 |
| 2008/0081878 A1 | 4/2008 | Jiang et al. | |
| 2008/0262148 A1 | 10/2008 | Bach et al. | |
| 2009/0069475 A1 | 3/2009 | Jiang et al. | |
| 2009/0306281 A1 | 12/2009 | Tancrede et al. | |

(Continued)

FOREIGN PATENT DOCUMENTS

| | | |
|---|---|---|
| CA | 2338221 | 2/2000 |
| EP | 0 277 003 | 8/1988 |
| EP | 0 277 004 | 8/1988 |
| EP | 0 495 375 | 7/1992 |
| EP | 0 500 944 | 9/1992 |
| EP | 0 520 732 | 12/1992 |
| EP | 0 570 982 | 11/1993 |
| EP | 0 886 656 | 12/1998 |
| EP | 1 125 980 | 8/2001 |

(Continued)

OTHER PUBLICATIONS

Property data of Escomer H101.*

(Continued)

*Primary Examiner* — Ling Choi
*Assistant Examiner* — Wenwen Cai

(57) ABSTRACT

The packaging industry desires adhesive compositions having a fast set time, such as those setting in less than five seconds from a molten state at conventional packaging operating temperatures to a solid or quasi solid having favorable Dot T-Peel, set time, and/or fiber tear adhesion properties. Polymer based adhesives performing within this window are a favorable alternative to conventional formulated adhesives. The provided adhesive compositions exhibit a favorable balance of properties such as high adhesive strength, wide temperature operating window, and fast set time. Provided are adhesive compositions composed of a polyolefin composition comprising at least about 50 mol % polypropylene, at least one wax and at least one wax modifier.

18 Claims, No Drawings

FOREIGN PATENT DOCUMENTS

| | | |
|---|---|---|
| EP | 1 243 248 | 9/2002 |
| WO | 96/33227 | 10/1996 |
| WO | 97/22639 | 6/1997 |
| WO | 97/48777 | 12/1997 |
| WO | 98/43983 | 10/1998 |
| WO | 98/46694 | 10/1998 |
| WO | 00/05306 | 2/2000 |
| WO | 01/30862 | 5/2001 |
| WO | 02/34856 | 5/2002 |
| WO | 2005/100501 | 10/2005 |
| WO | 2006/044149 | 4/2006 |
| WO | 2008/042037 | 4/2008 |

OTHER PUBLICATIONS

Property data of Polywax 3000.*
Property data of AC 392.*

J. Randall, "*IX. Long-Chain Branching in Polyethylene, Journal of Macromolecular Science*", Reviews in Macromolecular Chemistry and Physics, 1989, vol. C29, No. 2 and 3, pp. 285-297.

T. Sun et al., "*Effect of Short Chain Branching on the Coil Dimensions of Polyolefins in Dilute Solutions*", Macromolecules, 2001, vol. 34, No. 19, pp. 6812-6820.

G. Ver Strate et al., "*Near Monodisperse Ethylene-Propylene Copolymers by Direct Ziergler-Natta Polymerization. Preparation, Characterization, Properties*", Macromolecules, 1988, vol. 21, No. 12, pp. 3360-3371.

B. Wielage et al., "*Processing of Natural-Fibre Reinforced Polymers and the Resulting Dynamic-Mechanical Properties*", Journal of Materials Processing Technology, 2003, vol. 139, pp. 140-146.

W. Weng et al., "*Synthesis of vinyl-terminated isotactic poly(propylene)*", Macromolecular Rapid Communication, 2000, vol. 21, No. 16, pp. 1103-1107.

\* cited by examiner

POLYOLEFIN ADHESIVE COMPOSITIONS AND METHOD OF MAKING THEREOF

CROSS REFERENCE TO RELATED APPLICATIONS

This application claims the benefit of prior U.S. Provisional application Ser. No. 61/182,339 filed May 29, 2009, which is hereby incorporated by reference in its entirety.

BACKGROUND

This invention relates to polyolefin adhesive compositions, a method of making thereof and articles made therefrom.

Hot melt adhesives (HMAs) have become part of everyday life. With the development of high speed manufacturing and processing equipment, hot melt adhesives can be found in many applications. These ranges from furniture and shoe manufacture, to packaging applications, to the production of baby diapers and cigarettes.

A HMA is a thermoplastic material, which is solid at room temperature, and which is applied in its molten form to a substrate and which will adhere to the surface of the substrate when cooled to a temperature below its melting point. They differ from other liquid adhesives in that they set simply by cooling rather than by chemical curing or the evaporation of a solvent.

As HMAs are 100% solid systems, they reduce transportation and storage problems. The instantaneous bond strength supplied by these adhesives has allowed the development of high speed production machinery. Their higher viscosity compared to solvent based systems allows them to be used on various porous and non-porous substrates without sacrificing bond strength. In addition, because they do not set by means of solvent evaporation, they do not create a pollution problem. This latter fact is becoming increasingly important with the rising environmental awareness.

In HMA compositions, wax having a low viscosity may be used to reduce the high viscosity of the high molecular weight polymer component and resin to ensure efficient mixing. This reduction in viscosity is particularly important during the application stage. A low viscosity helps pump the molten adhesive from the storage tank to the application area and to ensure proper surface wetting of the substrate when applied. US 2008/0081868 discloses such a HMA composition in which a wax is present.

The degree of crystallinity and the congealing point of the wax in the adhesive composition influences the open and set times of the HMA, as well as the flexibility and elongation properties. Wax also plays a major role in decreasing blocking of a pelletized HMA adhesive composition to prevent the adhesive pellets from sticking together during transport and storage. The high temperature properties of a hot melt adhesive are also largely controlled by the melting range of the wax which is used.

The packaging industry favors adhesive compositions with a fast set time, setting in less than five seconds from a molten state at conventional packaging operating temperatures to a solid or quasi solid having favorable Dot T-Peel, fiber tear and/or combinations of the aforesaid adhesion properties. Hot melt polymer based adhesives performing within this window are a favorable alternative to conventional formulated adhesives.

Accordingly, there exists a current and long felt need for adhesive compositions that overcome known deficiencies in conventional compositions and that have advantageous processing properties.

SUMMARY

According to the invention there is provided an adhesive composition and a method as defined in any one of the accompanying claims.

In an embodiment, there is provided an adhesive composition comprising (i) a polyolefin polymer comprising a propylene content of at least 50 mol % wherein the polyolefin polymer has a heat of fusion from 2 to 120 J/g; a weight average molecular weight (Mw) from 15,000 to 250,000; and a weight average molecular weight/number average molecular weight ratio (Mw/Mn) from about 1.8 to 10; the composition further comprising (ii) at least one wax; and (iii) at least one wax modifier.

The wax modifier may comprise a functionalized polyolefin polymer, preferably a functionalized polyethylene polymer.

Typically, the wax modifier imparts a set time improvement of about 33% or more compared to a reference composition prepared with the same adhesive composition in the absence of a wax modifier. The adhesive composition may comprise from 0.01 to 10 wt % of the wax modifier based on the total weight of the adhesive composition, preferably from 0.01 to 8 wt %, more preferably from 0.1 to 5 wt %.

The polyolefin polymer may also comprise a copolymer comprising at least 80 wt % of units derived from propylene and from about 1 to about 20 wt % of units derived from at least one C6 to C10 alpha-olefin, wherein the copolymer has a molecular weight of less than 100,000 and a heat of fusion between about 10 and about 70 J/g. In a preferred embodiment, the polyolefin polymer comprises a metallocene catalyst polymerization derived copolymer of propylene and at least one monomer.

In another embodiment, there is provided a method of making an adhesive composition comprising providing (i) a polyolefin polymer comprising at least 50 mol % wherein the polyolefin polymer has a heat of fusion from 2 to 120 J/g; a weight average molecular weight (Mw) from 15,000 to 250,000; and a weight average molecular weight/number average molecular weight ratio (Mw/Mn) from about 1.8 to 10; the method further comprising (ii) providing at least one wax; and (iii) providing at least one wax modifier, and blending said copolymer, said wax and said wax modifier to form the adhesive composition such that the composition comprises a set time of less than about 4 seconds as measured by Dot Set Time.

The adhesive composition of the invention may comprise a fiber tear at −18° C. of about 10% or greater in comparison with said same adhesive composition in which the wax modifier is absent. The set time of the composition may be equal to or less than 3 seconds when determined by the following equation:

$$\text{set time} = 5.26 - 6.9 \times 10^{-5} * [\text{wax viscosity at } 140° \text{C.,} (\text{mPa·s})] - 0.021 * [\text{wax softening point,}(° \text{C.})].$$

In this equation, the wax softening point is defined by at least one of (a)-(d): (a) mettler drop point as determined by ASTM-D3954-94 is greater than 110° C., (b) congealing point as determined by ASTM D-938 is greater than 110° C., (c) ring and ball softening point as determined by ASTM E-28 is greater than 110° C., or (d) peak melt temperature as determined by DSC is greater than 110° C.

The adhesive composition of the invention exhibits a favorable balance of properties including high adhesive strength, wide temperature operating window, and fast set time.

DESCRIPTION OF THE PREFERRED EMBODIMENTS

In HMAs, limitations in set time hinder the production of sealed products at high production speeds. For example, if the set time of the HMA composition is too slow, the adhesive seal can become undone on the production line. This is highly undesirable.

To control the HMA properties and the set times of the adhesive in particular, traditionally, waxes have been added to the HMA composition. Waxes also prevent the HMA which is produced in pellet form from sticking together during transport and storage.

Generally, increasing amounts of wax reduce the set time of the HMA. However, other adhesive properties such as the adhesive strength are compromised. To prevent this, wax modifiers are added to the HMA. These wax modifiers can reduce the compromising effects of the wax and also improve the adhesive properties. This results in a HMA with favorable adhesive properties and a reduced set time.

In an embodiment, the adhesive composition of the invention comprises a polyolefin composition comprising at least 50 mole % of a polypropylene polymer; at least one wax; and at least one wax modifier.

In a preferred embodiment, the polyolefin polymer comprises a copolymer comprising at least 80 wt % of units derived from propylene and from about 1 to about 20 wt % of units derived from at least one C6 to C10 alpha-olefin, wherein the copolymer has a molecular weight of less than 100,000 and a heat of fusion between about 10 and about 70 J/g.

Preferably, the copolymer comprises about 2 wt % to about 15 wt %, more preferably about 2 wt % to about 12 wt %, of units derived from said at least one C6 to C10 alpha-olefin. Preferably, said copolymer has a molecular weight of less than 80,000, such as less than 50,000.

Various components of the adhesive composition of the invention are disclosed in detail below.

Polyolefin Polymer Compositions

The adhesive compositions of the invention are composed of polyolefin polymer compositions, which include propylene polymers. Propylene-based polymers are polymers comprised of a majority of propylene monomers on a molar basis. As used herein, "polypropylene", "polypropylene polymer(s)", or "propylene polymer(s)" mean (i) homopolymers, copolymers, terpolymers, higher order copolymers, or interpolymers comprised of a majority of propylene monomers on a molar basis or (ii) combinations thereof.

As used herein, the term "homopolymer" means polymers resulting from the polymerization of a single monomer, i.e., a polymer consisting essentially of a single type of repeating unit.

In another embodiment of the invention, the polyolefin may comprise a propylene-based polymer backbone. The propylene-based polymer backbone preferably comprises propylene, one or more C2 or C4-C20 α-olefins, and optionally a non-conjugated diene. The propylene-based polymer backbone, for example, may comprise propylene, ethylene, and optionally 5-ethylidene-2-norbornene (ENB) or a linear α-omega diene.

In certain embodiments the polyolefin may have a level of isotacticity ranging from 50% to 99%.

The average molecular weight Mw of the polyolefin may range from 1000 to 250,000 or from 2000 to 200,000, preferably from 5000 to 150,000. Typically the average molecular weight may range from 10,000 to 150,000, preferably from 10,000 to 100,000.

The polyolefin polymer may comprise a component with branching index (g') of from 0.7 to 0.98 measured at the Mz of the polyolefin when the polyolefin has an Mw of 10,000 to 60,000, or a branching index (g') of from 0.7 to 0.95 measured at the Mz of the polyolefin when the polyolefin has an Mw of 10,000 to 100,000.

As used herein, the term "copolymer(s)" refers to polymers formed by the polymerization of at least two different monomers. For example, the term "copolymer" includes the copolymerization reaction product of propylene and an alpha-olefin, such as for example, 1-hexene and also terpolymers.

The presently disclosed copolymer comprises at least 80%, preferably at least 85% by weight of units derived from propylene. Generally, the maximum concentration of propylene-derived units in the copolymer is 98%, preferably 95%, more preferably 90% by weight of the copolymer. In addition to propylene-derived units, the present copolymer contains from 1% to 20% by weight, preferably from about 2% to about 15% by weight, more preferably about 2% to about 12% by weight, and most preferably about 2% to about 10% by weight of units derived from at least one C6 to C10 alpha-olefin. In one preferred embodiment, the copolymer comprises about 90 wt % of propylene-derived units and about 10 wt % of units derived from said at least one C6 to C10 alpha-olefin.

One, two or more comonomers can be copolymerized with propylene. Preferred comonomer may be derived from ethylene or α-olefins containing 4 to 12 carbon atoms. Exemplary α-olefins may be selected from the group consisting of ethylene; 1-butene; 1-pentene-2-methyl-1-pentene-3-methyl-1-butene; 1-hexene-3-methyl-1-pentene-4-methyl-1-pentene-3,3-dimethyl-1-butene; 1-heptene; 1-hexene; 1-methyl-1-hexene; dimethyl-1-pentene; trimethyl-1-butene; ethyl-1-pentene; 1-octene; methyl-1-pentene; dimethyl-1-hexene; trimethyl-1-pentene; ethyl-1-hexene; 1-methylethyl-1-pentene; 1-diethyl-1-butene; propyl-1-pentene; 1-decene; methyl-1-nonene; 1-nonene; dimethyl-1-octene; trimethyl-1-heptene; ethyl-1-octene; methylethyl-1-butene; diethyl-1-hexene; 1-dodecene and 1-hexadodecene.

Preferably, propylene copolymers include no more than about 20 wt %, or no more than about 15 wt % of α-olefin comonomers based on the weight of the propylene copolymer. More preferably, propylene copolymers include no more than about 12, or no more than about 10 wt % of α-olefin comonomers based on the weight of the copolymer. Still more preferably, propylene copolymers include no more than about 9, or no more than about 7 wt % of α-olefin comonomers based on the weight of the copolymer. In one or more embodiments propylene copolymers include from about 3.0 to about to about 7.0 wt % of α-olefin comonomers based on the weight of the copolymer. In other embodiments, propylene copolymers include from about 4 wt % to about 6 wt % of α-olefin comonomers based on the weight of the copolymer. In still other embodiments, propylene copolymers include no more than about 5 wt % or from about 3 wt % to about 5 wt % of α-olefin comonomers based on the weight of the copolymer.

Preferred C6 to C10 alpha-olefins are those having 6 to 8 carbon atoms, with the most preferred alpha-olefin being hexene-1.

The copolymer can contain small amounts, generally less than 10% by weight of units derived from other comonomers, such as ethylene, C4 and C5 alpha-olefins and C11 to C20 alpha-olefins, but preferably the copolymer consists essentially of units derived from propylene and one or more C6 to C10 alpha-olefins. In particular, the copolymer is preferably free of diolefins.

The present copolymer has a heat of fusion as determined by differential scanning calorimetry (DSC) between about 2 and 120 J/g, for example between about 10 and 110 J/g, between about 20 and 100 J/g, between about 30 and 90 J/g, between about 10 and about 70 J/g, between about 10 and about 60 J/g, between about 20 and about 50 J/g, or between about 20 and about 40 J/g. The copolymer typically has a melting point of less than 150° C., or preferably less than 140° C., more preferably less than 130° C. This melting point is due to crystallizable propylene sequences, preferably of isotactic polypropylene. The semi-crystalline copolymer has stereoregular propylene sequences which are long enough to crystallize. The length and distribution of stereoregular propylene sequences is consistent with the substantially random statistical copolymerization. It is well known that sequence length and distribution are related to the copolymerization reactivity ratios. By "substantially random", we mean copolymer for which the product of the reactivity ratios is 2 or less. In stereoblock structures, the average length of polypropylene sequences is greater than that of substantially random copolymers with a similar composition. Prior art polymers with stereoblock structure have a distribution of polypropylene sequences consistent with these blocky structures rather than a random substantially statistical distribution. The reactivity ratios and sequence distribution of the polymer can be determined by C-13 NMR which locates the comonomer residues in relation to the neighboring propylene residues. This is according to the procedures described in the article by H. Kakugo, Y Naito, K. Mizunama and T. Miyatake in Macromolecules (1982), pages 1150-1152.

The weight averaged molecular weight (Mw) of the copolymer is preferably less than 250,000, more preferably less than 100,000 and typically less than 80,000, such as less than 50,000. In general, the weight averaged molecular weight of the copolymer is at least 5,000, such as at least 10,000 or at least about 15,000. The copolymer may have a molecular weight distribution (MWD, Mw/Mn) within the range from 1.5 to 10, preferably 1.8 to 5, more preferably from 1.8 to 2.5 or 1.8 to 3.0 or 1.8 to 4.0 in certain embodiments. In one embodiment, the copolymer has a MWD of greater than about 4.0. Typically, the ratio of the weight averaged molecular weight (Mw) of the copolymer to the number averaged molecular weight (Mn) of the copolymer is between 1.8 and 10, such as between 2 and 7. Generally, the semi-crystalline copolymer has a viscosity of less than 50,000 mP·s, for example less than 25,000 mP·s, such as less than 10,000 mP·s, for example less than 5,000 mP·s, typically less than 1,000 mP·s measured at 190° C. using a Brookfield viscometer.

In embodiments, the polyolefin polymers as described here have a melt index in dg/min ("MI"), according to ASTM D-1238 at 2.16 kg and 190° C., of 10 or more, preferably 100 or more, even more preferably 200 or more. The polymer may have a melt index (MI) greater than 1 dg/min as measured by ASTM D1238 (B), preferably greater than 10 dg/min. The MI may range from 1 to 1000 dg/min, preferably 1 to 300 dg/min, more preferably 2 to 250 dg/min. Typically the MI may range from 1 to 250 dg/min, from 1 to 200 dg/min, from 1 to 150 dg/min, from 2 to 100 dg/min or from 5 to 50 dg/min.

In other embodiments, the polyolefin polymer can also be a heterophasic polypropylene having an isotactic polypropylene phase and a dispersed rubber phase. In these cases, the melting point of the polypropylene will be between 165° C. and 120° C.

As discussed, in certain embodiments, the polypropylene(s) are isotactic. Isotacticity of the propylene sequences in the polypropylenes can be achieved by polymerization with the choice of a desirable catalyst composition. The isotacticity of the polypropylenes as measured by C-13 NMR, and expressed as meso diad content is greater than 90% (meso diads[m]>0.90) or 95% or 97% or 98% in certain embodiments as determined in U.S. Pat. No. 4,950,720 by C-13 NMR which is incorporated herein by reference. Expressed another way, the isotacticity of the polypropylenes as measured by C-13 NMR, and expressed as pentad content, is greater than 93% or 95% or 97% in certain embodiments.

The polyolefin can vary widely in composition. For example, substantially isotactic polypropylene homopolymer or propylene copolymer containing equal to or less than 20 wt % of other monomer, that is, at least 80 wt % by weight propylene can be used. Further, the polypropylene can be present in the form of a graft or block copolymer, in which the blocks of polypropylene have substantially the same stereoregularity as the propylene-α-olefin copolymer so long as the graft or block copolymer has a sharp melting point above 110° C. or 115° C. or 130° C. The polypropylene may be a combination of homopolypropylene, and/or random, and/or block copolymers as described herein.

In some embodiments, polymers have a Mooney viscosity [ML (1+4)@ 125° C.], as determined according to ASTM D1646, of more than about 100, or of more than about 200, or of more than about 300, and in other embodiments of more than about 30.

In another embodiment, the polyolefin polymer may comprise a peak melting point (Tm) between 80° C. and 150° C., preferably between 90° C. to 130° C. The polymer may comprise a glass transition temperature (Tg) of 5° C. or less, preferably of 0° C. or less.

In some embodiments, the polyolefin polymer described above also has a crystallization point (Tc) between 20° C. and 115° C. In some embodiments the Tc is between 70° C. to 100° C. In other embodiments, the Tc is between 30° C. to 80° C. In other embodiments, the Tc is between 20° C. to 50° C. The Tc may be at least 10° C. below Tm.

The polyolefin composition comprises at least about 50 wt % propylene, preferably at least about 60% propylene, alternatively at least about 70% propylene, alternatively at least about 80% propylene or at least about 90 wt % propylene.

In certain embodiments, the polypropylene described herein is predominately crystalline, thus the polypropylene may have a melting point (Tm) greater than 110° C. or 115° C. or 130° C. or 140° C., or 150° C., or 160° C. The term "crystalline," as used herein, characterizes those polymers which possess high degrees of inter- and intra-molecular order.

The polyolefin composition may have a crystallinity of about 40% or less. Preferably, the polyolefin composition has a crystallinity of about 30% or less, alternatively about 20% or less. In some embodiments, the polyolefin composition has a crystallinity of from about 5% to about 40% or from about 10% to about 30%. Percent crystallinity content is determined using Differential Scanning Calorimetry measurement according to ASTM D3418-03.

In certain embodiments, the polyolefin has a heat of fusion (Hf) greater than 20 J/g or 30 J/g or 40 J/g or 50 J/g or 60 J/g, as determined by DSC analysis. In another embodiment, the polyolefin has a heat of fusion from about 80 J/g to about 120 J/g and from about 90 J/g to about 110 J/g. The heat of fusion is dependent on the composition of the polyolefin; the thermal energy for the highest order of polyolefin is estimated at 189 J/g that is, 100% crystallinity is equal to a heat of fusion of 189 J/g. A polyolefin homopolymer will have a higher heat of fusion than a copolymer or blend of homopolymer and copolymer.

In at least one embodiment, the polyolefin composition has at least two molecular weights fractions present at greater than about 2 wt %, preferably greater than about 20 wt %, each based upon the weight of the polymer as measured by gel permeation chromatography (GPC). The fractions can be identified on a GPC trace by observing two distinct populations of molecular weights. For example, the weight fractions are confirmed as percent by a GPC trace showing a peak at 20,000 Mw and another peak at 50,000 Mw where the area under the first peak represents more than 2 wt % of the polymer and the area under the second peak represents more than 2 wt % of the polymer. One skilled in the art of gel permeation chromatography will recognize the many possible combinations of molecular weight fractions.

In some embodiments, the polyolefin composition comprises polymers derived from 50 mole % propylene or greater and from 0 to 50 mole % ethylene, preferably from 0 to 30 mole % ethylene, more preferably from 0 to 15 mole % ethylene, more preferably from 0 to 10 mole % ethylene, more preferably from 0 to 5 mole % ethylene.

In a preferred embodiment, the polymer comprises from 50 mole % propylene or greater and from 0 to 50 mole % butene, preferably from 0 to 30 mole % butene, more preferably from 0 to 15 mole % butene, more preferably from 0 to 10 mole % butene, more preferably from 0 to 5 mole % butene.

In a preferred embodiment, the polymer comprises 50 mole % propylene or greater and from 0 to 50 mole % hexene, preferably from 0 to 30 mole % hexene, more preferably from 0 to 15 mole % hexene, more preferably from 0 to 10 mole % hexene, more preferably from 0 to 5 mole % hexene.

Methods of Making Polyolefin Polymer Compositions

Homopolymers may be prepared by any conventional synthesis processes. Preferably, polypropylene is prepared utilizing one or more catalysts, which are typically metallocene catalysts, by polymerization of an olefin monomer.

The copolymers described herein may be produced in any known polymerization process. Polymerization methods include high pressure, slurry, gas, bulk, suspension, supercritical, or solution phase, or a combination thereof, using a single-site metallocene catalyst system. The catalysts can be in the form of a homogeneous solution, supported, or a combination thereof. Polymerization may be carried out by a continuous, a semi-continuous or batch process and may include use of chain transfer agents, scavengers, or other such additives as deemed applicable. By continuous is meant a system that operates (or is intended to operate) without interruption or cessation. For example a continuous process to produce a polymer would be one where the reactants are continually introduced into one or more reactors and polymer product is continually withdrawn. In general, the propylene copolymer described herein is produced in a single polymerization zone using a single polymerization catalyst.

Preferably, the copolymer is made with a polymerization catalyst which forms essentially or substantially isotactic propylene sequences. Nonetheless, the polymerization catalyst used for the production of the propylene copolymer will introduce stereo- and regio-errors in the incorporation of propylene. Stereo errors are those where the propylene inserts in the chain with a tacticity that is not isotactic. A regio error is one where the propylene inserts with the methylene group or the methyldiene group adjacent to a similar group in the propylene inserted immediately prior to it. Such errors are more prevalent after the introduction of comonomer such as 1-hexene in the semi-crystalline propylene copolymer. Notwithstanding the presence of these errors, the semi-crystalline propylene copolymer is statistically random in the distribution of comonomer.

Preferably, the semi-crystalline propylene copolymer is made with a single site metallocene catalyst which allows only a single statistical mode of addition of propylene and comonomer in a well-mixed, continuous monomer feed stirred tank polymerization reactor and which allows only a single polymerization environment for all of the polymer chains of the semi-crystalline propylene copolymer. Details of suitable catalyst systems are disclosed in US2008/0081868 which is incorporated herein by reference.

The polymerization process employed to produce the presently disclosed copolymers can be conducted as a solution, bulk, gas or slurry polymerization process or a combination thereof, but preferably as a solution phase or bulk phase polymerization process.

The process may be carried out in a continuous stirred tank reactor, batch reactor or plug flow reactor, or more than one reactor operated in series or parallel. These reactors may have or may not have internal cooling or heating and the monomer feed may or may not be refrigerated. See the general disclosure of U.S. Pat. No. 5,001,205 for general process conditions. See also, International Patent Publication Nos. WO 96/33227 and WO 97/22639 which are incorporated herein by reference.

Methods For Preparing Adhesive Compositions

Exemplary processes for preparing the adhesive composition comprise providing a metallocene catalyst polymerization derived copolymer of propylene and at least one monomer selected from ethylene and C6 to C20 alpha-olefin, having a propylene content of at least 50 mole % and said propylene having a polypropylene crystallinity from 2% to 65% as disclosed herein, providing at least one wax; and providing at least one wax modifier. The copolymer, wax and wax modifier are blended to form the adhesive composition. The adhesive composition may be combined with one or more additives to form an adhesive. Optionally the adhesive is pelletized or drummed before it is shipped.

The adhesive or adhesive composition may be in the form of a masterbatch which requires dilution ("extension") with a polyolefin or a resin before it can be applied to a substrate.

Waxes

The adhesive composition may comprise one or more additives including waxes. In this section we discuss these waxes in further detail. Waxes include natural or synthetic waxes, polypropylene waxes, and polyethylene waxes. Waxes include Fischer Tropsch waxes, available from Sasol Corporation or Bareco Corporation, polyethylene waxes, available from Baker Petrolite Corporation, Honeywell Corporation, or Eastman Corporation, oxidized high density polyethylene homopolymer waxes, available from Honeywell Corporation, or maleated polyethylene waxes, available from Eastman Corporation.

In particular, waxes suitable for use in the invention include paraffin waxes, microcrystalline waxes, high density low molecular weight polyethylene waxes, by-product polyethylene waxes, oxidized Fischer Tropsch waxes and functionalized waxes such as hydroxyl stearamide waxes and fatty amide waxes. It is common in the art to use the terminology synthetic high melting point waxes to include high density low molecular weight polyethylene waxes, by-product polyethylene waxes and Fischer Tropsch waxes. Preferred waxes useful in the practice of the invention have a melting point of from about 60° C. to about 120° C. and will have an oil content of less than about 0.5 wt % based on the weight of the wax.

The wax may have a viscosity at 140° C. from about 100 mPa·s and about 10,000 mPa·s and at least one of (a)-(d): (a) mettler drop point as determined by ASTM-D3954-94 is greater than 110° C.; (b) a congealing point as determined by ASTM D-938 of greater than 110° C.; (c) a ring and ball softening point as determined by ASTM E-28 of greater than 110° C., or (d) a peak melt temperature as determined by DSC of greater than 110° C. In an embodiment, the wax has a weight average molecular weight equal to or greater than about 3000.

Preferred waxes are mixed with a polyolefin copolymer as described herein to yield a set time which is equal to or less than about 3 seconds when determined by the following equation:

$$\text{set time} = 5.26 - 6.9 \times 10^{-5} * [\text{wax viscosity at } 140°\text{ C.}, (cp)] - 0.021 * [\text{wax softening point}, (°\text{ C.})].$$

Wax Modifiers

Although the presence of a wax reduces the set time of the adhesive composition, the wax can also cause phase separation and reduce the adhesive properties of the composition. Wax modifiers or wax crystal modifiers have the effect of improving the adhesive properties of the adhesive. They increase the rate of nucleation and/or inhibit wax crystal growth. Also, the wax modifier decreases the size of the wax crystals so that more crystals are produced of a reduced size which do not interact together to form a rigid matrix which would otherwise inhibit elongation and flexibility of the adhesive.

Suitable wax modifiers comprise functionalized polyolefins. Suitable polyolefins are formed from alpha-monoolefin monomers having from 2 to 6 carbon atoms. Representative examples include polyethylene, polypropylene, or polyethylene-co-propylene.

The polyolefins can be functionalized (or modified) with unsaturated monomers (i.e., functional groups) such as carboxylic acids, dicarboxylic acids, organic esters, organic anhydrides, organic alcohols, organic acid halides (such as acid chlorides, acid bromides, etc.), organic peroxides, amides, and imides and include, for example, maleic, fumaric, acrylic, methacrylic, itaconic, crotonic, alpha methyl crotonic, and cinnamic acids as well as their anhydrides, esters and salt derivatives; vinyl acetate; N-phenylmaleimide; and unsaturated hydroxyl-containing compounds such as hydroxyethyl methacrylate, hydroxypropyl methacrylate, allyl alcohol and bis(hydroxyethyl)maleate; unsaturated epoxy group-containing compounds such as glycidyl methacrylate; unsaturated amide group-containing monomers such as acrylamide, methacrylamide and alkoxy-substituted amides such as N-butoxymethylacrylamide and N-ethoxymethylmethacrylamide; and nitriles such as acrylonitrile and methacrylonitrile. Preferably, the unsaturated monomer is an ethylenically unsaturated monomer.

The unsaturated monomer component comprises one or a mixture of unsaturated monomers. The functionalization of polyolefins with such unsaturated monomers bearing polar groups can be performed by means of copolymerization or grafting reactions promoted by radical initiators. Functionalized polyolefins include copolymers of the polyolefins with polymers formed from polymerization of the C2 to C6 olefins with unsaturated monomers. The unsaturated monomers may also be polymerized to form graft branches from the polyolefin and the unsaturated compounds themselves can be grafted onto the polyolefin, forming reactive sites rather than graft polymer branches.

The wax modifier may comprise at least one functionalized polyethylene wherein the base polyolefin polymer is grafted with an unsaturated monomer chosen from an unsaturated carboxylic acid, an ester of an unsaturated carboxylic acid, an acid anhydride, a di-ester, a salt of an unsaturated carboxylic acid, an unsaturated amide, an unsaturated imide, an aromatic vinyl compound, a hydrolyzable unsaturated silane compound, an unsaturated halogenated hydrocarbon.

Examples of wax modifiers include ethylene vinyl acetate (EVA), ethylene acrylic acid (EAA), alkyl acrylates, alkyl methylacrylates, ethylene 2-ethyl hexyl acrylate (EEHA) polymer. The EVA copolymer may have a melt index (MI) of 550 g/10 minutes or higher. The EVA polymer may comprise from 10% to 50%, preferably from 15% to 45% by weight of vinyl acetate. In particular, EVA copolymers may comprise Escorene™ Ultra UL-series resins such as Escorene™ Ultra UL 8705. Also, the EVA copolymers may comprise Escorene™ MV series resins.

The hot melt adhesive comprises about 0.01 wt % to 10 wt % based on the adhesive composition, preferably from 0.01 wt % to 5 wt % based on the adhesive composition of EVA. The adhesive composition further comprises from 20 wt % to 40 wt % based on the adhesive composition, preferably from 25 wt % to 35 wt % of a wax.

In a further embodiment, the wax modifier comprises a functionalized polyolefin polymer and preferably a functionalized polyethylene polymer. Preferred functional groups include maleic acid and maleic anhydride. "Functionalized" means that the polyethylene polymer has been contacted with an unsaturated acid or anhydride. Preferred unsaturated acids or anhydrides include any unsaturated organic compound containing at least one double bond and at least one carbonyl group. Representative acids include carboxylic acids, anhydrides, esters and their salts, both metallic and non-metallic.

Preferably, the organic compound contains an ethylenic unsaturation conjugated with a carbonyl group (—C=O). Examples include maleic, fumaric, acrylic, methacrylic, itaconic, crotonic, alpha-methyl crotonic, and cinnamic acids as well as their anhydrides, esters and salt derivatives. In a preferred embodiment the unsaturated acid or anhydride comprises a carboxylic acid or a derivative thereof selected from the group consisting of unsaturated carboxylic acids, unsaturated carboxylic acid derivatives selected from esters, imides, amides, anhydrides and cyclic acid anhydrides or mixtures thereof. Maleic anhydride is particularly preferred.

The unsaturated acid or anhydride is preferably present at about 0.1 wt % to about 10 wt %, preferably at about 0.5 wt % to about 7 wt %, even more preferably at about 1 to about 4 wt %, based upon the weight of the hydrocarbon resin and the unsaturated acid or anhydride.

In a preferred embodiment, the functionalized component is present at 0.005 wt % to about 30 wt %, more preferably between about 2 wt % and about 20 wt %, more preferably between about 2 wt % and about 15 wt %, more preferably between about 2 wt % and about 10 wt % based on the total weight of the adhesive composition. In some embodiments, the functionalized component is present from about 2 wt % and about 5 wt %, based upon the weight of the adhesive composition. Preferably, the functionalized component is present at 0.005 wt % to about 10 wt %, more preferably 0.01 wt % to about 10 wt %, based upon the weight of the blend.

In continuous processes for preparing polymer compositions, both the wax and wax modifier can be provided at various stages either separately or in combination. The wax and/or wax modifier can be mixed with the polymer composition before or after withdrawing polymer solution from the reactor system, and/or before or after removing the solvent. Also, the wax and/or wax modifier can be provided before or after devolatilizing the polymer solution to form molten polymer.

In a preferred embodiment, the wax modifier is provided before the removal of the solvent to improve blending of the modifier in the adhesive composition. This is particularly advantageous when blending vinyl acetate wax modifiers.

Other Additives

In addition to waxes, additives also include conventional additives known in the art, including fillers, antioxidants, adjuvants, adhesion promoters, plasticizers, oils, low molecular weight polymers, block, antiblock, pigments, processing aids, UV stabilizers, neutralizers, lubricants, surfactants nucleating agents, oxidized polyolefins, acid modified polyolefins, and/or anhydride modified polyolefins. Additives are combined with polymer compositions as individual components, in masterbatches, or combinations thereof.

Fillers include conventional fillers known to those skilled in the art, including titanium dioxide, calcium carbonate, barium sulfate, silica, silicon dioxide, carbon black, sand, glass beads, mineral aggregates, talc, and/or clay.

Antioxidants include conventional antioxidants known to those skilled in the art, including phenolic antioxidants, such as Irganox 1010, Irganox 1076 both available from Ciba-Geigy. In some embodiments, adhesive compositions include less than about 3 wt % anti-oxidant.

Oils include conventional oils known to those skilled in the art, including paraffinic or napthenic oils such as Primol 352, or Primol 876 available from ExxonMobil Chemical France, S.A. in Paris, France. Preferred oils include aliphatic naphthenic oils.

Plasticizers include conventional plasticizers known to those skilled in the art, including mineral oils, phthalates, or polybutenes, such as Parapol 950 and Parapol 1300 formerly available from ExxonMobil Chemical Company in Houston Tex. Preferred plasticizers include phthalates such as di-iso-undecyl phthalate (DIUP), di-iso-nonylphthalate (DINP), and dioctylphthalates (DOP).

Adhesion promoters include conventional adhesion promoters known to those skilled in the art. Adhesion promoters include polar acids, polyaminoamides, such as Versamid 115, 125, 140, available from Henkel, urethanes, such as isocyanate/hydroxy terminated polyester systems, e.g. bonding agent TN/Mondur Cb-75(Miles, Inc., coupling agents, such as silane esters (Z-6020 from Dow Corning), titanate esters, such as Kr-44 available from Kenrich, reactive acrylate monomers, such as sarbox SB-600 from Sartomer, metal acid salts, such as Saret 633 from Sartomer, and polyphenylene oxide.

Low number average molecular weight ($M_n$) polymers include conventional low $M_n$ polymers known to those skilled in the art. Preferred low $M_n$ polymers include polymers of lower alpha olefins such as propylene, butene, pentene, and hexene. A particularly preferred polymer includes polybutene having an $M_n$ of less than 1000. An example of such a polymer is available under the trade name PARAPOL™ 950 from ExxonMobil Chemical Company. PARAPOL™ 950 is a liquid polybutene polymer having a Mn of 950 and a kinematic viscosity of 220 cSt at 100° C., as measured by ASTM D 445. In some embodiments, polar and non-polar waxes are used together in the same composition.

Tackifiers, i.e., hydrocarbon resins, include conventional tackifiers known to those skilled in the art. Exemplary tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments, the tackifier is non-polar. Non-polar means that the tackifier is substantially free of monomers having polar groups. Preferably, the polar groups are not present; however, if they are preferably they are not present at more that 5 wt %, preferably not more that 2 wt %, even more preferably no more than 0.5 wt %. In some embodiments, the tackifier has a softening point (Ring and Ball, as measured by ASTM E-28) of 80° C. to 150° C., preferably 100° C. to 130° C.

The tackifier, if present, is typically present at about 1 wt % to about 20 wt %, based upon the weight of the blend, more preferably 2 wt % to 10 wt %, even more preferably 3 wt % to 10 wt %, based on the weight of the adhesive composition.

Exemplary tackifiers are commercially available as the ESCOREZ™ family, e.g., 5300, 5320, 5340, 5380, 5690, 5600, and 5620, or the Oppera™ series of polymeric additives from ExxonMobil Chemical Company.

Adhesive compositions are composed of less than about 30 wt % based on the total weight of the adhesive composition including the wax. Preferably, adhesive compositions include less than about 25 wt % additives, or less than about 20 wt % additives, or less than about 15 wt % additives, or less than about 10 wt % additives. In some embodiments, additives are present at less than about 5 wt %, or less than about 3 wt %, or less than about 1 wt %, based upon the weight of the adhesive composition. Exemplary adhesive compositions are commercially available from ExxonMobil Chemical Co. as the LINXAR™ adhesive family of products.

Adhesive Properties

The provided adhesive compositions exhibit fast sets times that are useful in the adhesive industry, e.g., the packaging industry. The adhesive composition does not set too fast or too slow such that the adhesive compositions can be used with conventional packaging equipment, e.g., cardboard box assembling equipment. Adhesives that set very quickly, e.g., less than 0.5 seconds, usually solidify before forming a sufficient bond between the materials being adhered. Similarly, adhesives that solidify very slowly, e.g., more than 10 seconds, will not form a sufficient bond between materials being adhered because conventional processing equipment require faster set times. We have found that when a wax modifier is present in the adhesive composition, the set time is still fast without the adhesive properties being compromised.

The present adhesive compositions have a set time of about 5 seconds or less, or about 4 seconds or less, or about 3 seconds or less, or about 2.5 seconds or less, or about 2 seconds or less, or about 1 second or less. Preferably, the adhesive compositions have a set time of from about 0.1 seconds to about 5 seconds or from about 0.5 second to about 3 seconds or from about 0.5 seconds to about 2.5 seconds.

Some conventional polyolefin based adhesives have been unable to achieve fast set times while still maintaining sufficient adhesion properties. Unlike conventional polyolefin based adhesives, the present adhesive compositions containing polyolefins maintain favorable adhesive properties, while also exhibiting a fast set time. Set time is defined as the time it takes for a compressed adhesive substrate construct to fasten together enough to give substrate fiber tear when pulled apart, and thus the bond is sufficiently strong to remove the compression.

SAFT (modified D4498) measures the ability of a bond to withstand an elevated temperature rising at 10 F (5.5° C.)/15 min., under a constant force that pulls the bond in the shear mode. Bonds were formed in the manner described above (1 inch by 3 inch (2.5 cm×7.6 cm) (on Kraft paper). The test specimens were suspended vertically in an oven at room temperature with a 500 gram load attached to the bottom. The temperatures at which the weight fell was recorded (when the occasional sample reached temperatures above the oven capacity >265° F. (129° C.) it was terminated and averaged in with the other samples at termination temperature). The adhesive composition of the invention has a SAFT of at least 100° C.

In some embodiments, the adhesive composition described above has a viscosity (also referred to a Brookfield Viscosity or Melt Viscosity) of 90,000 mP·s or less at 190° C. (as measured by ASTM D 3236 at 190° C.); or 80,000 mP·s or less, or 70,000 mP·s or less, or 60,000 mP·s or less, or 50,000 mP·s or less, or 40,000 mP·s or less, or 30,000 mP·s or less, or 20,000 mP·s or less, or 10,000 mP·s or less, or 8,000 mP·s or less, or 5000 mP·s or less, or 4000 mP·s or less, or 3000 mP·s or less, or 1500 mP·s or less, or between 250 and 6000 mP·s, or between 500 and 5500 mP·s, or between 500 and 3000 mP·s, or between 500 and 1500 mP·s, and/or a viscosity of 8000 mP·s or less at 160° C. (as measured by ASTM D 3236 at 160° C.); or 7000 mP·s or less, or 6000 mP·s or less, or 5000 mP·s or less, or 4000 mP·s or less, or 3000 mP·s or less, or 1500 mP·s or less, or between 250 and 6000 mP·s, or between 500 and 5500 mP·s, or between 500 and 3000 mP·s, or between 500 and 1500 mPa·s. In other embodiments, the viscosity is 200,000 mP·s or less at 190° C., depending on the application. In other embodiments, the viscosity is 50,000 mP·s or less depending on the applications.

In the Dot T peel test, specimens are pulled apart in side by side testing (at a rate of 2 inches per minute) by a machine that records the destructive force being applied. The maximum force achieved for each sample tested was recorded and averaged, thus producing the Average Maximum Force which is reported as the Dot T-Peel. The copolymer may comprise a Dot T-Peel from about 1 Newton and about 10,000 Newton, or from about 3 and about 4000 Newton, or between about 5 and about 3000 Newton, or between about 10 and about 2000 Newton, or between about 15 and about 1000 Newton. Typical fiber tear (FT) for the adhesive composition of the invention is greater than 80%, typically greater than 90% at room temperature.

End Uses

Adhesives compositions are used in general adhesive applications and specialty applications, including but not limited to, disposables, packaging, laminates, pressure sensitive adhesives, tapes labels, wood binding, paper binding, non-wovens, road marking, reflective coatings, and the like.

The adhesive compositions are used for disposable diaper and napkin chassis construction, elastic attachment in disposable goods converting, packaging, labeling, bookbinding, woodworking, and other assembly applications. Particularly, preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

Adhesive compositions may be applied directly to a substrate or may be sprayed thereon. Spraying is defined to include atomizing, such as producing an even dot pattern, spiral spraying, or melt blown techniques. In general, melt blown techniques are processes that use air to spin hot melt adhesive fibers and convey them onto a substrate for bonding. Fiber sizes can easily be controlled from 20-200 microns by changing the melt to air ratio.

The adhesives described above may be applied to any substrate. Preferred substrates include wood, paper, cardboard, plastic, thermoplastic, rubber, metal, metal foil (such as aluminum foil and tin foil), metallized surfaces, cloth, non-wovens (particularly polypropylene spun bonded fibers or non-wovens), spunbonded fibers, cardboard, stone, plaster, glass (including silicon oxide (SiOx)coatings applied by evaporating silicon oxide onto a film surface), foam, rock, ceramics, films, polymer foams (such as polyurethane foam), substrates coated with inks, dyes, pigments, PVDC and the like or combinations thereof.

Additional preferred substrates include polyethylene, polypropylene, polyacrylates, acrylics, polyethylene terephthalate, or any of the polymers listed above as suitable for blends.

Any of the above substrates, and/or compositions, may be corona discharge treated, flame treated, electron beam irradiated, gamma irradiated, microwaved, or silanized.

Experimental Methods

The following experimental procedures were used to measure the parameters which are disclosed in this specification.

Shear Adhesion Fail Temperature "SAFT" is measured in accordance with the standard test as defined by ASTM 4498.

In order to measure set time, Dot T-Peel and substrate fiber tear, adhesive test specimens were created by bonding the substrates together with a dot of about 0.3 grams of molten adhesive and compressing the bond with a 500-gram weight. The dot size was controlled by the adhesive volume such that in most cases the compressed disk which formed gave a uniform circle just inside the dimensions of the substrates.

Once a construct has been produced it can be subjected to various insults in order to assess the effectiveness of the bond. Once a bond to a substrate fails a simple way to quantify the effectiveness of the adhesive is to estimate the area of the adhesive dot that retained substrate fibers as the construct failed along the bond line. This estimate is called percent substrate fiber tear. An example of good adhesion, after conditioning a sample for 15 hours at 2° C. and attempting to destroy the bond, would be an estimate of 80-100% substrate fiber tear. It is likely that 0% substrate fiber tear under those conditions would signal a loss of adhesion.

For substrate fiber tear testing, the specimens were prepared using the same procedure as that described above. For low temperature fiber tear test, the bond specimens were placed in a freezer or refrigerator to obtain the desired test temperature. For substrate fiber tear at room temperature, the specimens were aged at ambient conditions. The bonds were separated by hand and a determination made as to the type of observed failure. The amount of substrate fiber tear is expressed herein as a percentage. All the fiber tear tests were conducted using Inland paper board as the substrate.

Set time was defined as the time it takes for a compressed adhesive substrate construct to fasten together enough to give substrate fiber tear when pulled apart, and thus the bond was sufficiently strong to remove the compression. The bond will likely still strengthen upon further cooling; however, it no longer requires compression. These set times were measured by placing a molten dot of adhesive on to a file folder substrate taped to a flat table. A file folder tab (1 inch by 3 inch (2.5 cm×7.6 cm) is placed upon the dot 3 seconds later and compressed with a 500 gram weight. The weight is allowed to sit for about 0.5 to about 10 seconds. The construct thus formed was pulled apart to check for a bonding level good enough to produce substrate fiber tear. The set time was recorded as the minimum time required for this good bonding to occur. Standards were used to calibrate the process.

Dot T-Peel is determined according to ASTM D 1876, except that the specimen was produced by combining two 1 inch by 3 inch (2.54 cm×7.62 cm) substrate cut outs with a dot of adhesive with a volume that, when compressed under a 500 gram weight occupied about 1 square inch of area (1 inch=2.54 cm). Once made all the specimens are pulled apart in side-by-side testing (at a rate of 5.0 cm per minute) by a machine (such as an Instron) that records the destructive force of the insult being applied. The maximum force achieved for each sample tested was recorded and averaged, thus producing the Average Maximum Force, which is reported as the Dot T-Peel.

Adhesive melt viscosity was measured using a Brookfield digital viscometer according to ASTM D-3236.

Molecular weights number average molecular weight (Mn), weight average molecular weight (Mw), and z-average molecular weight (Mz)) were determined using a Polymer Laboratories Model 220 high temperature SEC with on-line differential refractive index (DRI), light scattering, and viscometer detectors. The SEC used three Polymer Laboratories PLgel 10 m Mixed-B columns for separation, a flow rate of 0.54 cm$^3$/min, and a nominal injection volume of 300 μL. The detectors and columns are contained in an oven maintained at 135° C. The light scattering detector is a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The stream emerging from the SEC columns is directed into the miniDAWN optical flow cell and then into the DRI detector. The DRI detector is an integral part of the Polymer Laboratories SEC. The viscometer is a high temperature viscometer purchased from Viscotek Corporation and comprising four capillaries arranged in a Wheatstone bridge configuration with two pressure transducers. One transducer measures the total pressure drop across the detector, and the other, positioned between the two sides of the bridge, measures a differential pressure. The viscometer is inside the SEC oven, positioned after the DRI detector. The details of these detectors, as well as their calibrations, have been described by, for example, T. Sun, P. Brant, R. R. Chance, and W. W. Graessley, in *Macromolecules*, Volume 34, Number 19, 6812-6820, (2001), incorporated herein by reference.

Solvent for the SEC experiment was prepared by adding 6 grams of butylated hydroxy toluene (BHT) as an antioxidant to a 4 liter bottle of 1, 2, 4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/ 0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

The branching index (g') was measured using SEC with an on-line viscometer (SEC-VIS) and is reported as g' at each molecular weight in the SEC trace. The branching index g' is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-averaged molecular weight ($M_v$) as the branched polymer. $\eta_l = KM_v^\alpha$, K and α were measured values for linear polymers and should be obtained on the same SEC-DRI-LS-VIS instrument as the one used for branching index measurement. For polypropylene samples presented in this invention, K=0.0002288 and α=0.705 were used. Linear polymers selected as standards for comparison should be of the same viscosity average molecular weight, monomer content and composition distribution. Linear character for polymer containing $C_2$ to $C_{10}$ monomers is confirmed by Carbon-13 NMR using the method of Randall (Rev. Macromol. Chem. Phys., C29 (2&3), p. 285-297). Linear character for C11 and above monomers is confirmed by GPC analysis using a MALLS detector. For example, for a copolymer of propylene, the NMR should not indicate branching greater than that of the co-monomer (i.e., if the comonomer is butene, branches of greater than two carbons should not be present). For a homopolymer of propylene, the GPC should not show branches of more than one carbon atom. When a linear standard is desired for a polymer where the comonomer is $C_9$ or more, one can refer to T. Sun, P. Brant, R. R. Chance, and W. W. Graessley, *Macromolecules*, Volume 34, Number 19, 6812-6820, (2001) for protocols on determining standards for those polymers (incorporated herein by reference). In the case of syndiotactic polymers, the standard should have a comparable amount of syndiotacticity as measured by Carbon 13 NMR. The viscosity averaged g' was calculated using the following equation:

$$g'_{vis} = \frac{\sum c_i [\eta_i]_b}{\sum c_i KM_i^\alpha}$$

where $c_i$ is the polymer concentration in the slice i in the polymer peak, and $[\eta_1]_b$ is the viscosity of the branched polymer in slice i of the polymer peak, and $M_i$ is the weight averaged molecular weight in slice i of the polymer peak measured by light scattering, K and α are as defined above.

Melting point (Tm), peak crystallization temperature (Tc), glass transition temperature (Tg), and heat of fusion (Hf) and percent crystallinity were determined by differential scanning calorimetry (DSC) by the following procedure according to ASTM D3418-03 using a TA Instruments model Q100 or Q200. Samples weighing approximately 5-10 mg are sealed in aluminum hermetic sample pans. The DSC data were recorded by first gradually heating the sample to 200° C. at a rate of 10° C./minute. The sample was kept at 200° C. for 2 minutes, and then cooled to −90° C. at a rate of 10° C./minute, followed by an isothermal for 2 minutes and heating to 200° C. at 10° C./minute. Both the first and second cycle thermal events are recorded. Areas under the melting peaks are measured and used to determine the heat of fusion and the degree of crystallinity. The percent crystallinity (X %) is calculated using the formula, X %=[area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) is used as the heat of fusion for 100% crystalline polypropylene. The amorphous content (%) is calculated using the formula (100-percent of crystallinity). The melting temperature is measured and reported during the second heating cycle (or second melt).

For polymers displaying multiple endothermic and exothermic peaks, all the peak crystallization temperatures and peak melting temperatures were reported. The heat of fusion for each endothermic peak was calculated individually. The percent crystallinity is calculated using the sum of heat of fusions from all endothermic peaks. Some of polymer blends produced show a secondary melting/cooling peak overlapping with the principal peak, which peaks are considered together as a single melting/cooling peak. The highest of these peaks is considered the peak melting temperature/crystallization point. For the amorphous polymers, having comparatively low levels of crystallinity, the melting temperature is typically measured and reported during the first heating cycle. Prior to the DSC measurement, the sample was aged (typically by holding it at ambient temperature for a period up to about 2 days) or annealed to maximize the level of crystallinity.

EXAMPLES

The invention will now be illustrated with reference to the following Examples. The Examples, which are not intended to be limiting, present certain embodiments and advantages of the hot melt adhesive compositions of the invention. Unless otherwise indicated, any percentages are on a weight basis, based on the total weight of the adhesive composition.

The following materials were used in examples identified in the following table.

TABLE 1

Details of compositions used in Samples.

| SAMPLE | DESCRIPTION | SOURCE |
|---|---|---|
| A | Composition comprising (i) >90 wt % propylene-hexene copolymer wherein the copolymer has the following properties: $T_g = -17.2°$ C., $T_m = 126°$ C., $T_c = 72.8°$ C., $H_f = 31.7$ J/g; (ii) 4.0 wt % FTF Wax; and (iii) 3.28 wt % MAPP | ExxonMobil |
| B | Composition comprising (i) >90 wt % propylene-hexene copolymer wherein the copolymer has the following properties: $T_g = -16.2°$ C., $T_m = 124.8°$ C., $T_c = 68.2°$ C., $H_f = 35.4$ J/g; (ii) 4.4 wt % FTF Wax; and (iii) 3.38 wt % MAPP | ExxonMobil |
| C | Composition comprising (i) propylene-hexene copolymer wherein the copolymer has the following properties: $T_g = -17.2°$ C., $T_m = 126°$ C., $T_c = 72.8°$ C., $H_f = 31.7$ J/g; (ii) 4.9 wt % FTF Wax; and (iii) 3.4 wt % MAPP | ExxonMobil |
| D | Composition comprising (i) >90 wt % propylene-hexene copolymer wherein the copolymer has the following properties: $T_g = -18.6°$ C., $T_m = 124.7°$ C., $T_c = 73.3°$ C., $H_f = 35.2$ J/g; (ii) 4.4 wt % FTF Wax; and (iii) 3.4 wt % MAPP | ExxonMobil |
| E | Composition comprising (i) >90 wt % propylene-hexene copolymer wherein the copolymer has the following properties: $T_g = -17.2°$ C., $T_m = 124.1°$ C., $T_c = 68°$ C., $H_f = 34.3$ J/g; (ii) 4.7 wt % FTF Wax; (iii) 2.88 wt % MAPP | ExxonMobil |
| F | Composition comprising propylene-hexene copolymer wherein the copolymer has the following properties: $T_g = -15.8°$ C., $T_m = 127.8°$ C., $T_c = 71.2°$ C., $H_f = 33.9$ J/g; (ii) 5.0 wt % FTF Wax; and (iii) 4.00 wt % MAPP | ExxonMobil |
| G | Sample A aged for 67 hours at a temperature of 117° C. | ExxonMobil |
| UL8705 | Ethylene vinyl acetate (EVA) copolymer, melt index = 800 g/10 min (ASTM D1238), melt viscosity = 9300 mPa · s, density = 0.953 g/cm$^3$, 27.6% vinyl acetate | ExxonMobil |
| AC392 | Oxidized polyethylene wax, density = 0.99 g/cm$^3$, Brookfield viscosity @ 150° C. = 4500 mPa · s | Honeywell |
| AC405T | Ethylene vinyl acetate copolymer, density = 0.92 g/cm$^3$, Brookfield viscosity @ 140° C. = 600 mPa · s | Honeywell |
| AC540 | Ethylene acrylic acid (EAA) copolymer (95/5 E/AA), density = 0.93 g/cm$^3$, Brookfield viscosity @ 140° C. = 575 mPa · s, acid number (mg KOH/g) = 40 | Honeywell |
| AC575P | Ethylene maleic anhydride copolymer, density = 0.92 g/cm$^3$ | Honeywell |
| AC820 | Polyethylene wax, density = 0.97 g/cm$^3$ | Honeywell |
| AC1302P | Ethylene-maleic anhydride copolymer with viscosity of 248 cP at 190° C. and Saponification number of 5 mg KOH/g | Honeywell |
| Advantra 9250 | Hot Melt Adhesive (HMA) comprising copolymer of ethylene and octane-1 (30-60 wt %), paraffin wax (30-60 wt %), hydrogenated hydrocarbon resin (10-30 wt %) | Fuller |
| FTF Wax | Fischer Tropsch fractionated wax, carbon numbers C15 to C80, peak at C40 | |
| MAPP | Maleated polypropylene (MAPP) with acid value of 45~50, viscosity at 190° C. of 400-425 mPa · s, and softening point of 143~155° C. | |
| Inland | Inland board stock, #56 virgin high performance paper board stock | Inland Paper Board and Packaging Company of Rome, Georgia |
| Kraft Paper | Kraft paper | Georgia Pacific, Atlanta, Georgia |

Example

Samples of the adhesive composition were prepared by blending the various polymers with a wax (Fisher Tropsh fractioned wax) in various quantities together with a number of wax modifiers AC405T, UL8705, AC540, AC1302 and AC575P in various quantities as outlined in Table 2. Table 2 further lists the set time, fiber tear at 21° C., 2° C. and −18° C. for each of the Samples. Inland paper board was used as the substrate for fiber tear in all tests. Inland paper board is a high performance box board obtained from Inland Paper Board and Packaging Company of Rome, Ga. It is characterized as a #56 virgin high performance paper board stock.

Each of the Samples A-G comprise (i) a propylene-hexene copolymer having a weight average molecular weight of from 35,000 to 60,000 and a propylene content of approximately 90 wt % and hexene content of approximately 10 wt %; (ii) from 4 to 6 wt % FTF Wax, and (iii) from 2 to 4 wt % MAPP. Table 2 below illustrates certain characteristics of the Samples when a wax modifier is added.

TABLE 2

Set time and Fiber tear for various Samples.

| Sample | AC405T (wt %) | UL8705 (EVA) (wt %) | AC540 (EAA) (wt %) | AC1302P (wt %) | AC575P (wt %) | Set Time (sec) | % Fiber Tear (21° C.) | % Fiber Tear (2° C.) | % Fiber Tear (−18° C.) |
|---|---|---|---|---|---|---|---|---|---|
| A1 | | | | | | >3 | 97 | 97 | 95 |
| A2 | 1.96 | | | | | 3.25 | | | |
| A3 | 5.00 | | | | | 2.25 | | | |
| A4 | | 2.19 | | | | 2.25 | | | |
| A5 | | 5.97 | | | | 2.25 | | | |
| A6 | | | 3.86 | | | 1.5 | 96 | 96 | 84 |
| G1 | | | 4.49 | | | 1.5 | 94 | 91 | 76 |
| G2 | | | 3.21 | | | 2.25 | | | |
| B1 | | | | | | 3+ | 97 | 96 | 93 |
| B2 | | | 4.19 | | | 1.75 | 96 | 93 | 91 |
| B3 | 5.09 | | | | | 3 | 91 | 89 | 90 |
| B4 | | 2.10 | | | | 2.25 | 96 | 86 | 88 |
| C1 | | | | | | 2.75 | 96 | 97 | 93 |
| C2 | | | 3.99 | | | 1.75+ | 96 | 96 | 96 |
| C3 | 4.84 | | | | | 2.25 | 96 | 97 | 98 |
| C4 | | 2.02 | | | | 2.25 | 97 | 97 | 95 |
| D1 | | | | | | 2.5− | 99 | 90 | 92 |
| D2 | | | 9.32 | | | 1.5 to 1.75 | 95 | 76 | 62 |
| D3 | | | 7.13 | | | 2.25 | | | |
| D4 | | | | 9.35 | | 2.25 | | | |
| E1 | | | | | | 3+ | 97 | 91 | 92 |
| E2 | | 4.07 | | | | 2− | 96 | 94 | 79 |
| E3 | 5.07 | | | | | 2.75 | 98 | 95 | 92 |
| E4 | | | | | | 3.25 | 98 | 93 | 92 |
| E5 | | | 9.00 | | | 1.75 | 95 | 32 | 10 |
| E6 | | | 6.85 | | | 1.75 | 96 | 58 | 69 |
| E7 | | | | | 9.03 | 2+ | | | |
| F | | | | | | | 98 | 98 | 98 |
| F | | | 10.04 | | | | 93 | 90 | 73 |

There is thus provided an adhesive composition which has improved overall adhesive properties including advantageous set time and fiber tear properties.

The above description is intended to be illustrative, and should not be considered limiting. Persons skilled in the art will recognize that various modifications may be made without departing from the spirit and scope of the invention. Accordingly, this description will be deemed to include all such modifications that fall within the appended claims and their equivalents. Certain features of the present invention are described in terms of a set of numerical upper limits and a set of numerical lower limits. It should be appreciated that ranges from any lower limit to any upper limit are within the scope of the invention unless otherwise indicated.

What is claimed is:

1. An adhesive composition comprising:
   (i) a polyolefin polymer comprising a propylene content of at least 50 mol % wherein the polyolefin polymer has:
      (a) a heat of fusion from 2 to 120 J/g;
      (b) a weight average molecular weight (Mw) from 15,000 to 250,000;
      (c) a weight average molecular weight/number average molecular weight ratio (Mw/Mn) from about 1.8 to 10;
   (ii) at least one wax having a weight average molecular weight equal to or greater than about 3000, a viscosity at 140° C. from about 100 mPa·s to about 10,000 mPa·s and a wax softening point as defined by at least one of (A)-(D):
      (A) mettler drop point as determined by ASTM-D3954-94 greater than 110° C.;
      (B) congealing point as determined by ASTM D-938 greater than 110° C.;
      (C) ring and ball softening point as determined by ASTM E-28 is greater than 110° C.; or
      (D) peak melt temperature as determined by DSC is greater than 110° C.; and
   (iii) a wax modifier comprising a functionalized polyethylene and a maleated polypropylene.

2. The composition of claim 1, wherein said composition comprises a set time of less than about 4 seconds as measured by Dot Set Time.

3. The composition of claim 1, wherein the wax modifier comprises at least one functionalized polyethylene chosen from an ethylene vinyl acetate copolymer, ethylene acrylate acid copolymer, and ethylene-maleic anhydride copolymer.

4. The composition of claim 1, wherein the wax modifier comprises at least one functionalized polyethylene comprising a base polyethylene grafted with an unsaturated monomer chosen from an unsaturated carboxylic acid, an ester of an unsaturated carboxylic acid, an acid anhydride, a di-ester, a salt of an unsaturated carboxylic acid, an unsaturated amide, an unsaturated imide, an aromatic vinyl compound, a hydrolyzable unsaturated silane compound, and an unsaturated halogenated hydrocarbon.

5. The composition of claim 1, wherein the wax modifier comprises an ethylene vinyl acetate copolymer having a melt index (MI) of 550 g/10 minutes or higher, the EVA copolymer comprising from 10% to 50% by weight of vinyl acetate.

6. The composition of claim 1, wherein the wax modifier imparts a set time improvement of about 33% or more compared to a reference composition prepared with the same adhesive composition in the absence of a wax modifier.

7. The composition of claim 1, wherein the composition comprises from 0.01 wt % to 10 wt % of the wax modifier based on the total weight of the adhesive composition.

8. The composition of claim 1, wherein the polyolefin polymer has a melt index (MI) greater than 1 dg/min as measured by ASTM D1238(B).

9. The composition of claim 1, wherein the polyolefin polymer has a weight average molecular weight of 15,000 to 100,000, and either a branching index (g') of from 0.7 to 0.98 measured at the z-average molecular weight of the polyolefin when the polyolefin polymer has an weight average molecular weight of 15,000 to 60,000, or a branching index (g') of from 0.7 to 0.95 measured at the z-average molecular weight of the polyolefin when the polyolefin has an weight average molecular weight of 15,000 to 100,000.

10. The composition of claim 1, wherein the polyolefin polymer comprises at least 80 wt % of units derived from propylene and from about 1 to about 20 wt % of units derived from at least one C6 to C10 alpha-olefin, wherein the copolymer has a weight average molecular weight of less than 100,000 and a heat of fusion between about 10 and about 70 J/g.

11. The adhesive composition of claim 1, wherein fiber tear at −18° C. of about 10% or greater in comparison with said same adhesive composition in which the wax modifier is absent.

12. The adhesive composition of claim 1, wherein set time is equal to or less than 3 seconds when determined by the following equation:

set time=5.26−6.9×10$^{-5}$*[wax viscosity at 140° C., (mPa·S)]−0.021*[wax softening point,(° C.)].

13. A hot melt adhesive composition comprising:
(i) a polyolefin polymer comprising a propylene content of at least 50 mol % wherein the polyolefin polymer has:
  (a) a heat of fusion from 2 to 120 J/g;
  (b) a weight average molecular weight (Mw) from 15,000 to 250,000;
  (c) a weight average molecular weight/number average molecular weight ratio (Mw/Mn) from about 1.8 to 10;
(ii) at least one wax having a weight average molecular weight equal to or greater than about 3000, a viscosity at 140° C. ($\mu_{wax}$) from about 100 mPa·s to about 10,000 mPa·s and a wax softening point ($SP_{wax}$) as defined by at least one of (A)-(D):
  (A) mettler drop point as determined by ASTM-D3954-94 is greater than 110° C.;
  (B) congealing point as determined by ASTM D-938 is greater than 110° C.;
  (C) ring and ball softening point as determined by ASTM E-28 is greater than 110° C.; or
  (D) peak melt temperature as determined by DSC is greater than 110° C.; and
(iii) at least one wax modifier comprising a functionalized polyethylene;
wherein the hot melt adhesive has a set time is equal to or less than 3 seconds when determined by the following equation:

set time=5.26−6.9×10$^{-5}$*$\mu_{wax}$−0.021*$SP_{wax}$ wherein $\mu_{wax}$ is the wax viscosity at 140° C. (mPa·s) and $SP_{wax}$ is the wax softening point (° C.) as defined by at least one of (A)-(D).

14. The hot melt adhesive composition of claim 13, wherein the wax modifier comprises at least one functionalized polyethylene chosen from an ethylene vinyl acetate copolymer, ethylene acrylate acid copolymer, and ethylene-maleic anhydride copolymer, and wherein the wax modifier further comprises maleated polypropylene.

15. The hot melt adhesive composition of claim 13, wherein the wax modifier comprises at least one functionalized polyethylene comprising a base polyethylene grafted with an unsaturated monomer chosen from an unsaturated carboxylic acid, an ester of an unsaturated carboxylic acid, an acid anhydride, a di-ester, a salt of an unsaturated carboxylic acid, an unsaturated amide, an unsaturated imide, an aromatic vinyl compound, a hydrolyzable unsaturated silane compound, and an unsaturated halogenated hydrocarbon.

16. A hot melt adhesive composition comprising:
(i) a polyolefin polymer comprising a propylene content of at least 50 mol % wherein the polyolefin polymer has:
  (a) a heat of fusion from 2 to 120 J/g;
  (b) a weight average molecular weight (Mw) from 15,000 to 250,000;
  (c) a weight average molecular weight/number average molecular weight ratio (Mw/Mn) from about 1.8 to 10;
(ii) at least one wax having a weight average molecular weight equal to or greater than about 3000, a viscosity at 140° C. ($\mu_{wax}$) from about 100 mPa·s to about 10,000 mPa·s and a wax softening point ($SP_{wax}$) as defined by at least one of (A)-(D):
  (A) mettler drop point as determined by ASTM-D3954-94 is greater than 110° C.;
  (B) congealing point as determined by ASTM D-938 is greater than 110° C.;
  (C) ring and ball softening point as determined by ASTM E-28 is greater than 110° C.; or
  (D) peak melt temperature as determined by DSC is greater than 110° C.; and
(iii) at least one wax modifier comprising an ethylene vinyl acetate copolymer and a maleated polypropylene, wherein the ethylene vinyl acetate copolymer has a melt index (MI) of 550 g/10 minutes or higher, the EVA copolymer comprising from 15% to 45% by weight of vinyl acetate;
wherein the hot melt adhesive has a set time is equal to or less than 3 seconds when determined by the following equation:

set time=5.26−6.9×10$^{-5}$*$\mu_{wax}$−0.021*$SP_{wax}$ wherein $\mu_{wax}$ is the wax viscosity at 140° C. (mPa·s) and $SP_{wax}$ is the wax softening point (° C.) as defined by at least one of (A)-(D).

17. The composition of claim 1, wherein the polyolefin polymer has a heat of fusion between about 80 and about 120 J/g.

18. The composition of claim 16, wherein the polyolefin polymer has a heat of fusion between about 80 and about 120 J/g.

* * * * *